Sept. 5, 1939.  A. LITTLE ET AL  2,172,127
CONDIMENT HOLDER
Filed May 21, 1938    2 Sheets-Sheet 1
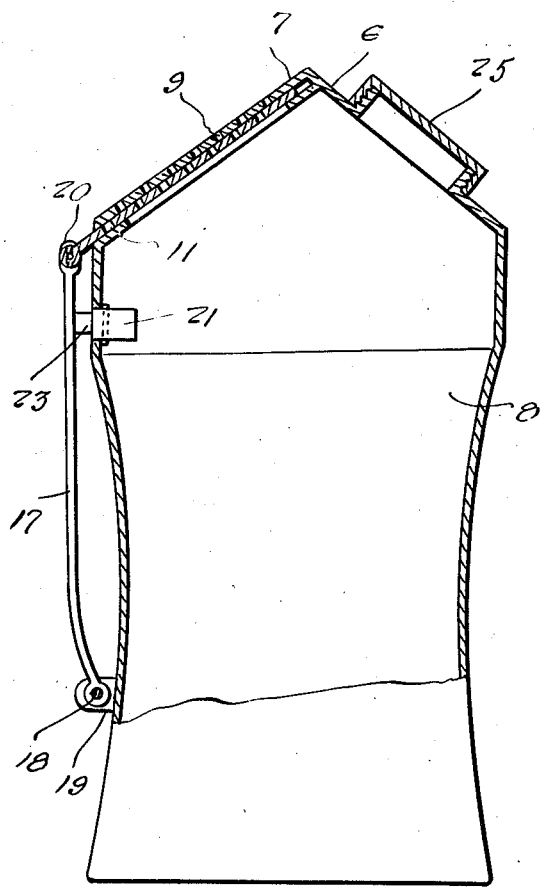
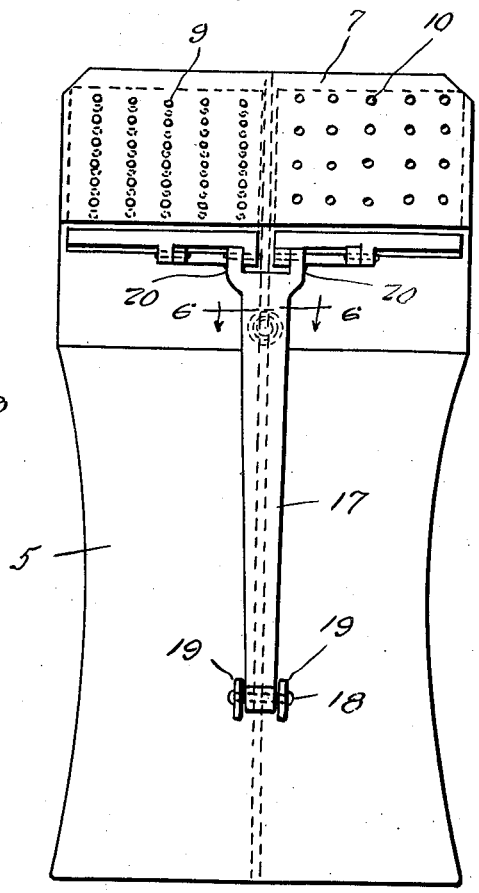
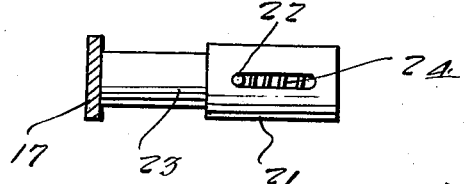
Inventors
Alton Little
Ivan Little
By Clarence A. O'Brien
and Hyman Berman
Attorneys

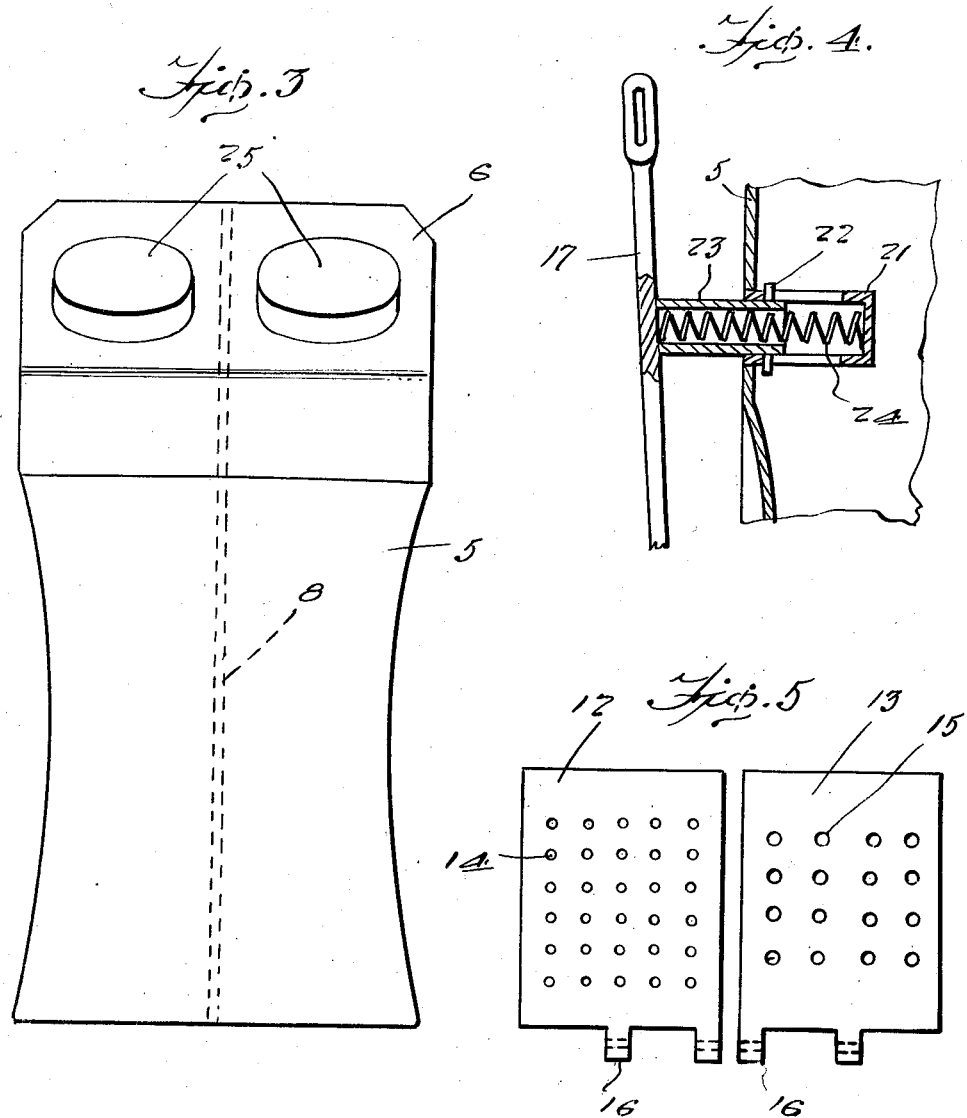

Patented Sept. 5, 1939

2,172,127

UNITED STATES PATENT OFFICE 2,172,127

CONDIMENT HOLDER

Alton Little and Ivan Little, Woodson, Tex.

Application May 21, 1938, Serial No. 209,319

2 Claims. (Cl. 65—45)

This invention appertains to new and useful improvements in condiment holders such as are usually intended for holding pepper and salt.

The principal object of the present invention is to provide a condiment holder for containing, for instance, pepper and salt, and from which without operating the control means, one condiment can be dispensed and by operating the control means the aforementioned condiment can be shut off from dispensation and the other made available for dispensation.

Another important object is to provide a condiment holder which is of simple construction and which will not easily get out of order.

These and various other important objects and advantages of the invention will become apparent to the reader of the following specification.

In the drawings:

Figure 1 represents a front elevational view of the holder.

Figure 2 is a vertical sectional view through the major portion of the holder.

Figure 3 is a rear elevational view of the holder.

Figure 4 is a fragmentary detailed sectional view through the control means of the holder.

Figure 5 is a top plan view of the two slide plates.

Figure 6 is a sectional view through the control means taken substantially on the line 6—6 of Figure 1.

Referring to the drawings wherein like numerals designate like parts, it can be seen that numeral 5 represents the container which is preferably provided with concaved side walls. This container has upwardly converging top walls 6—7. Numeral 8 denotes a vertical partition in the container dividing the interior into a pair of compartments, one for salt and the other for pepper, this partition extending upwardly to the converging top walls 6—7 and dividing the area of small perforations 9 in the top 7 from the area of large perforations 10 in the top 7, the former being for the discharge of pepper and the latter for salt.

Under each of these areas 9—10 is a guide formation 11 and between the guide formations 11 and these areas 9—10 are the slide plates 12—13, respectively, the plate 12 being provided with fine openings 14 for pepper and the slide plate 13 with larger openings 15 for salt.

The lower ends of these slide plates 12—13 are provided with apertured lugs 16. Numeral 17 represents an elongated hand grip the lower end of which is pivotally secured as at 18 between the ears 19—19 on the lower portion of the container 5 while the upper portion is provided with upstanding spaced ears 20—20 and pins extend through these ears for pivotally securing these ears to the lugs 16. In fact, these pins extend through slots in the ears 20 to take care of any movement of the upper end of the hand grip 17 describing an arc through the plane of movement of the plates 12—13.

A barrel 21 is mounted on the inside of the container 5 and has its open end extending into an opening in the front wall of the container 5. The barrel 21 is provided with slots in the upper and lower portions thereof through which the pintles 22 on the tube 23 extend and are slidable. The tube 23 extends from the hand grip 17 into the barrel 21 and a coiled compressible spring 24 has one end abutting the inner end of the barrel 21 and its other end the hand grip 17. This affords tensioning means for the hand grip 17 so that it is normally urged outwardly so that the plate 12 has its openings 14 out of registration with the openings 9 and the plate 13 is held with its openings 15 registering with the openings 10.

By moving the hand grip 17 inwardly, the openings 10 are shut off by the plate 13 while the plate 12 is moved into position registering its openings 14 with the openings 9 in the top 7 of the container.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A condiment holder comprising a container provided with an inclined top portion having an opening therein, a super top portion disposed in closed spaced relation to the first mentioned top portion to define a guide space, a slide plate disposed in the guide space and formed with perforations, said super top portion being formed with perforations, a vertically extending lever having its lower end swingably connected to the lower portion of the container, a pin and slot connection between the upper end of the lever and the lower end of the slide plate, spring means between the container and the lever, and telescopic means between the container and the lever adapted to encase said spring means.

2. A condiment holder comprising a container provided with an inclined top portion having an opening therein, a super top portion disposed in closed spaced relation to the first mentioned top portion to define a guide space, a slide plate disposed in the guide space and formed with perforations, said super top portion being formed with perforations, a vertically extending lever having its lower end swingably connected to the lower portion of the container, a pin and slot connection between the upper end of the lever and the lower end of the slide plate, spring means between the container and the lever, said spring means comprising a tube extending from the lever, said container having an opening therein for receiving the tube, a tubular structure projecting inwardly of the container from the edge portion of the opening therein and receiving the tube projecting from the lever, and spring means interposed between the outer end of the lever tube and the inner end of the container tube.

ALTON LITTLE.
IVAN LITTLE.